(12) United States Patent
Severinsson

(10) Patent No.: US 6,878,089 B2
(45) Date of Patent: Apr. 12, 2005

(54) PLANETARY GEAR UNIT

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/725,917

(22) Filed: Dec. 1, 2003

(65) Prior Publication Data

US 2004/0192485 A1 Sep. 30, 2004

Related U.S. Application Data

(63) Continuation of application No. PCT/SE02/01102, filed on Jun. 6, 2002.

(30) Foreign Application Priority Data

Jun. 6, 2001 (SE) ................................................ 0101968

(51) Int. Cl.⁷ .............................................. F16H 57/08
(52) U.S. Cl. ...................................... 475/337; 188/72.1
(58) Field of Search ...................... 475/337; 188/72.2, 188/72.3, 156, 157, 158, 159, 160, 161, 162; 303/115.2

(56) References Cited

U.S. PATENT DOCUMENTS

| 4,804,073 A | 2/1989 | Taig et al. ................. 188/72.1 |
| 4,860,859 A * | 8/1989 | Yamatoh et al. ............ 188/72.1 |
| 6,405,836 B1 * | 6/2002 | Rieth et al. ................. 188/72.1 |
| 6,666,308 B1 * | 12/2003 | De Vries et al. ............ 188/157 |
| 6,705,435 B2 * | 3/2004 | Severinsson ................ 188/72.8 |
| 6,752,249 B1 * | 6/2004 | Jungbecker et al. ......... 188/162 |
| 6,806,602 B2 * | 10/2004 | Hilzinger et al. ............. 310/77 |

FOREIGN PATENT DOCUMENTS

| EP | 0 372 219 B1 | 10/1989 |
| SE | 99 04 396 | 6/2001 |
| WO | WO 00/28234 | 5/2000 |

* cited by examiner

Primary Examiner—Dirk Wright
(74) Attorney, Agent, or Firm—St. Onge Steward Johnston & Reens LLC

(57) ABSTRACT

A planetary gear unit in an electrically operated brake transmits a brake applying rotational movement with reduced speed to the brake. The unit has two stages with an ingoing first shaft, a second shaft and an outgoing gear as well as planet wheels, sun wheel gearings and housing gearings. The first and second shafts are journalled in relation to each other, and the outgoing gear is journalled on the second shaft.

6 Claims, 3 Drawing Sheets

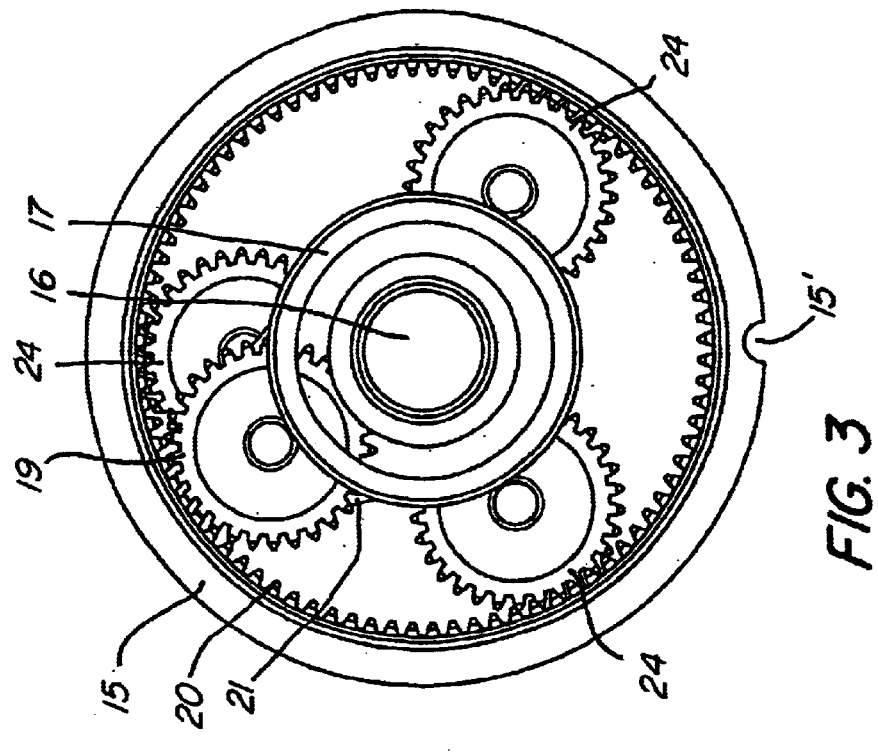
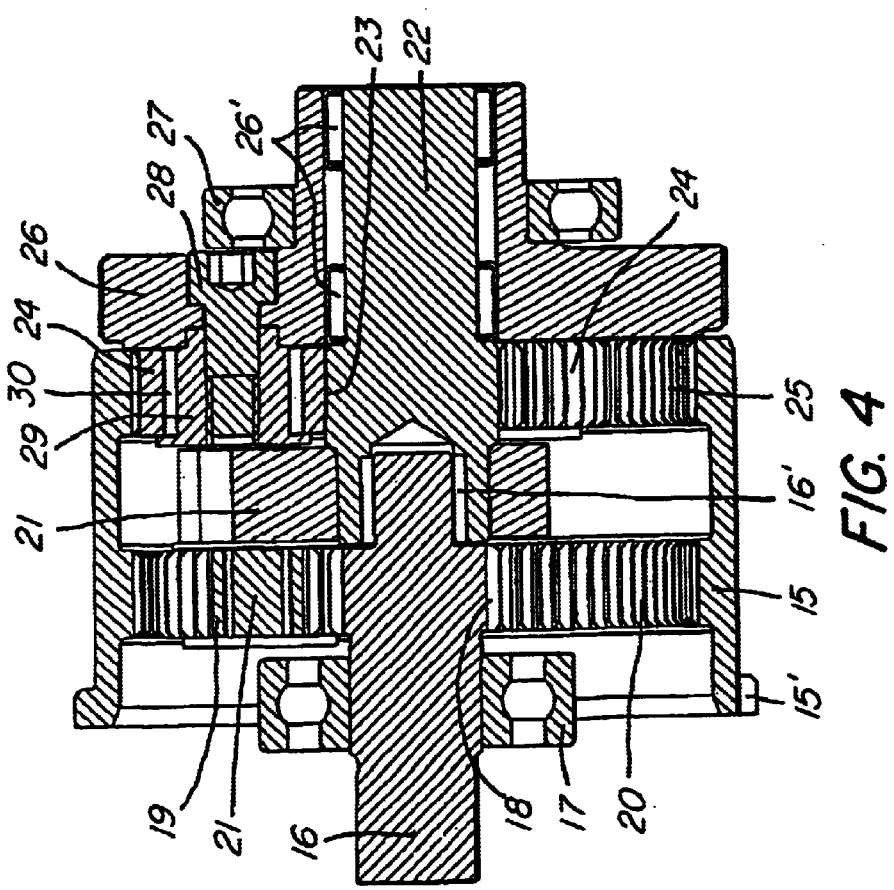

PLANETARY GEAR UNIT

This application is a continuation of pending International Patent Application No. PCT/SE02/01102 filed Jun. 6, 2002, which designates the United States and claims priority of pending Swedish Application No. 0101968-6 filed Jun. 6, 2001.

FIELD OF THE INVENTION

The present invention relates to a planetary gear unit in an electrically operated brake for reducing the rotational speed from a drive shaft of an electric motor to an outgoing rotating means, which transmits a brake applying rotational movement to the brake, comprising a first planet wheel between a sun wheel gearing on an ingoing first shaft and a first internal gearing in a housing of the unit, a crank arm, on which the first planet wheel is rotationally arranged and which is rigidly connected to a second shaft coaxial with the first shaft, at least one second planet wheel between a second sun wheel gearing on the second shaft and a second internal gearing in the housing of the unit, and an outgoing gear, which is coaxial with the first and second shafts and to which the at least one second planet wheel is rotatably connected.

BACKGROUND OF THE INVENTION

There is a tendency to employ an electric drive motor as the means for operating a brake actuator for a vehicle. In the present case this electric motor is used for operating a disc brake, especially but not exclusively for a heavy road vehicle, such as a truck, trailer, or bus. This disc brake contains means for transforming the rotational movement of the electric motor into a translational movement of a brake pad.

It is advantageous to use an electric motor with a high rotational speed, which has to be reduced. This rotational speed reduction—and accordingly moment increase—can be accomplished by means of a conventional gear train, but a planetary gear unit may provide advantages, for example with regard to volume and cost.

A planetary gear unit falling within the definition above is shown in EP-A-0 372 219. In its portion falling within said definition, this planetary gear unit is per se conventional and is not shown and described in any detail.

An important aspect is that the planetary gear unit shall be as compact as possible without in any way sacrificing its function and durability.

THE INVENTION

This may according to the invention be obtained in that the first and second shafts are journalled in relation to each other by means of a radial bearing and in that the outgoing gear is journalled on the second shaft by means of radial bearings.

By this arrangement a very compact design is obtained with an advantageous journalling and guiding of the rotating members of the gear unit. The only function of the housing will be to transmit moment.

BRIEF DESCRIPTION OF THE DRAWINGS

The invention will be described in further detail below under reference to the accompanying drawings, in which FIG. 3 is an end view of the planetary gear unit according to the invention, and FIG. 4 is a cross-sectional view through the planetary gear unit shown in FIGS. 2 and 3.

DETAILED DESCRIPTION OF A PREFERRED EMBODIMENT

Figure 1:
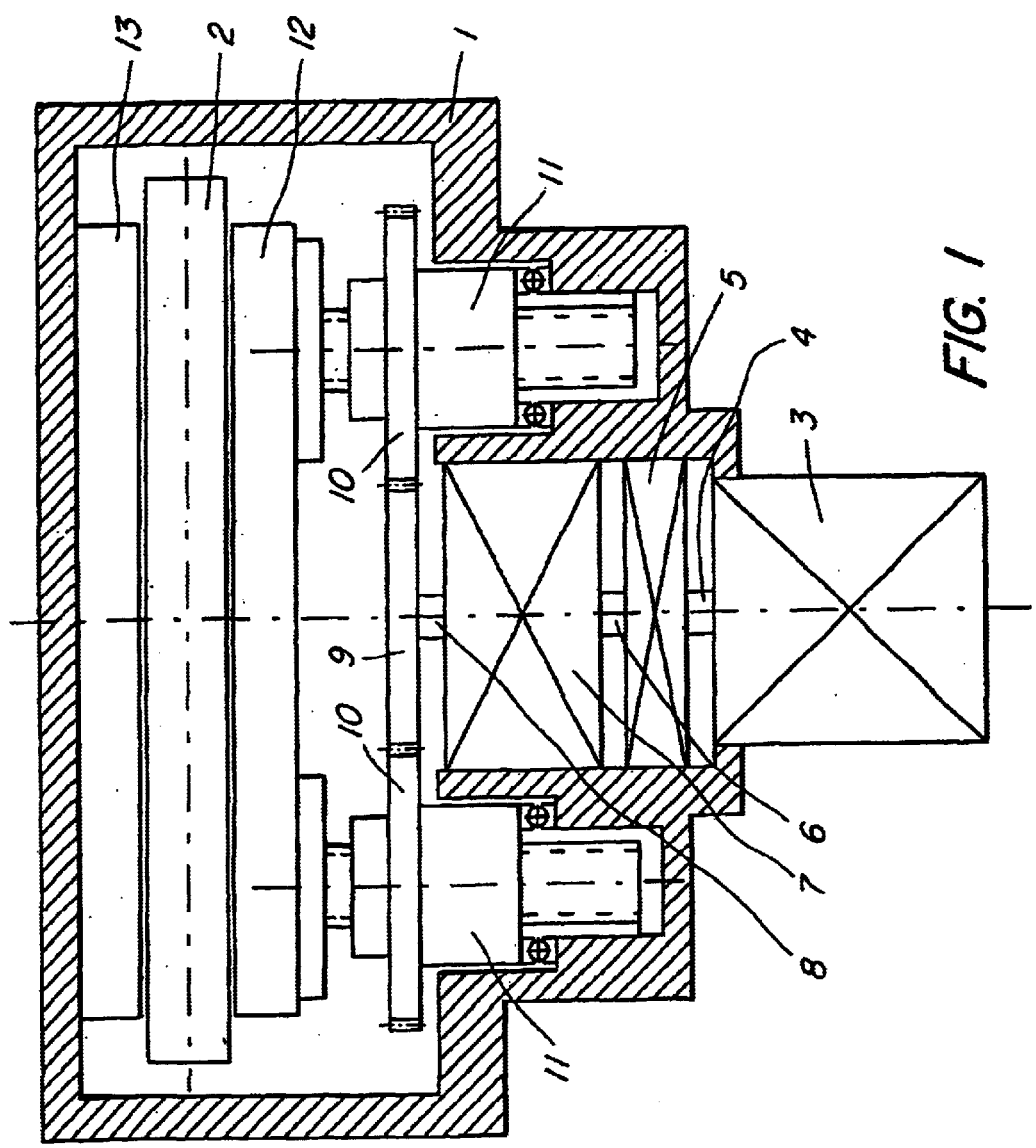
FIG. 1 is a very schematical plan view, partly in section, of a disc brake embodying the invention.

A disc brake embodying a planetary gear unit according to the invention is very schematically shown in FIG. 1. A disc brake caliper 1 is to be mounted astraddle of a brake disc 2 on a vehicle axle. The vehicle is preferably but not exclusively a heavy road vehicle, such as a bus, a truck, or a trailer.

An electric motor 3 is attached to the caliper 1. Its drive shaft 4, which may be rotated in either direction by the motor 3, is connected to a coupling 5 of the kind that keeps its outgoing coupling shaft 6 non-rotatable or braked, in a brake release direction, when no current is supplied to the motor 3.

The coupling shaft 6 is in turn connected to a gear box 7 for reducing the rotational speed from the coupling shaft 6 to its outgoing gear unit shaft 8.

The gear unit shaft 8 is provided with a gear 9 in gear engagement with a thrust rod gear 10 of each of two thrust rods 11. The three gears 9 and 10 may have the same diameter and rotate with the same speed. However, depending on the circumstances, they may have different diameters.

The thrust rods 11 have the general function of transforming the ingoing rotational movement of the gear. 10 into an outgoing linear movement of a part connected to the first disc brake pad 12 at one side of the brake disc 2. At the other side of the brake disc 2 there is a second disc brake pad 13 connected to the caliper 1, which in this case is of the so called floating type, i.e. it is mounted for certain movements perpendicularly to the disc 2. The caliper may, however, equally well be of the fixed type.

With the briefly described design the first disc brake pad 12 will be applied against the brake disc 2, when the motor 3 is rotated in its application direction. At a motor rotation in the opposite direction the disc brake pad 12 will be withdrawn from the brake disc 2.

Figure 2:
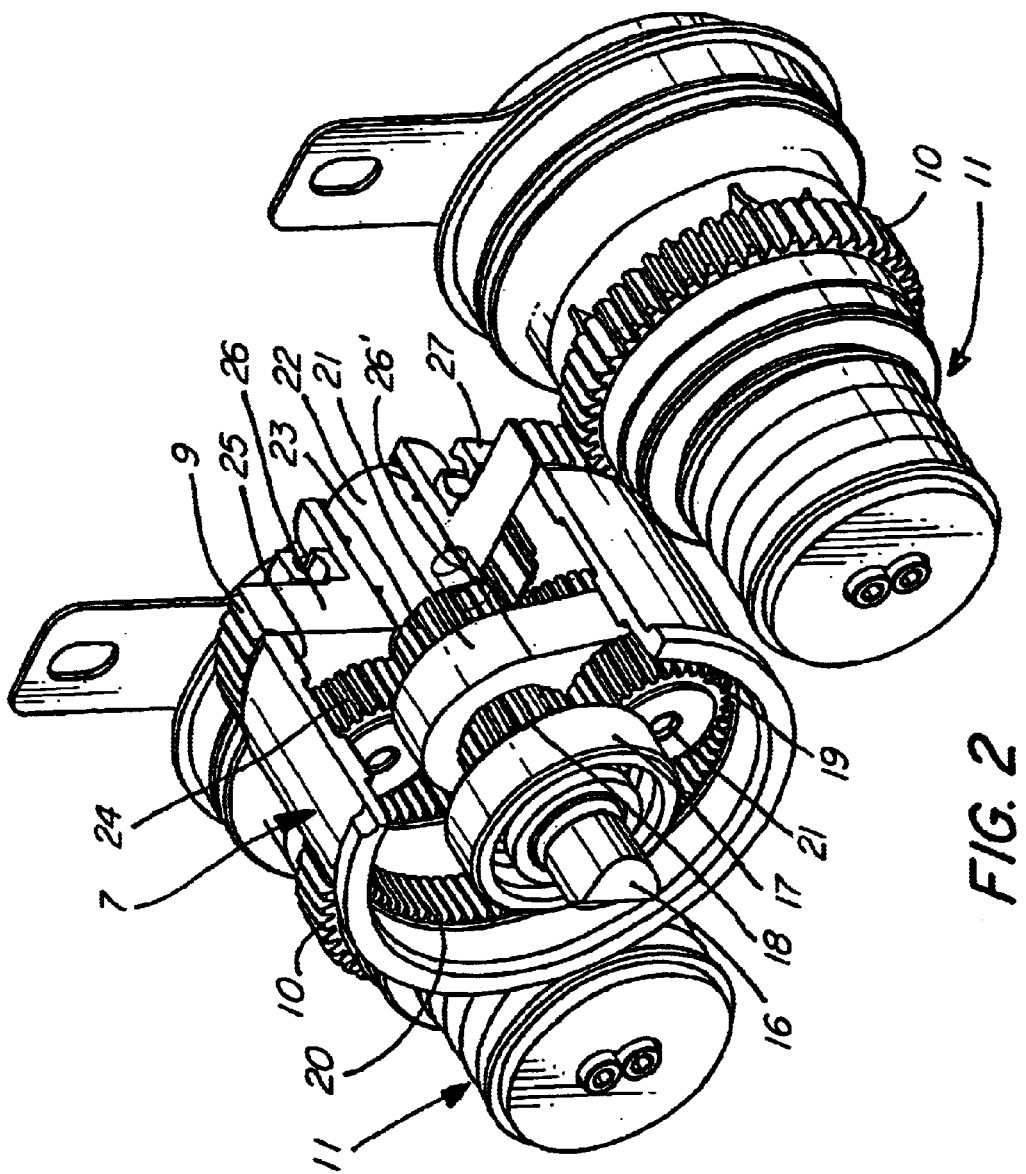
FIG. 2 is a perspective view of important members of a disc brake as shown in FIG. 1 with a planetary gear unit according to the invention partly cut-away.

In FIG. 2 the gear unit 7 with its outgoing gear 9 in engagement with the thrust rod gears 10 of the two thrust rods 11 is shown.

As is also shown in FIGS. 3 and 4, the gear unit 7 has a generally cylindrical housing 15 for mounting in the disc brake caliper 1, where it is rotationally locked at a notch 15'.

An ingoing first shaft 16 is to be rotationally driven in either direction by the electric motor 3 (FIG. 1) and is journalled by means of a radial bearing 17. By being provided with a gearing 18, the first shaft 16 constitutes a first sun wheel.

A first planet wheel 19 is in gear engagement with the sun wheel 18 as well as with a first internal gear ring 20 in the housing 15. As the forces in this part of the gear box are comparatively low, only one first planet wheel 19 may be needed. However, several, for example three, first planet wheels 19 may be provided.

The first planet wheel 19 is connected to a crank arm 21, which has a pin 21' in a through center hole in the first planet wheel 19. A bearing is preferably provided between the pin 21' and the hole in the first planet wheel 19.

The crank arm 21 is non-rotatably connected to a second sun wheel in the form of a second shaft 22 coaxial with the ingoing shaft 16 and provided with a gearing 23. A bearing 16' is provided between the shafts 16 and 22.

For example three second planet wheels 24 are preferably equidistantly distributed around the second sun wheel and in gear engagement therewith. These second planet wheels 24 are also in gear engagement with a second internal gear ring 25 in the housing 15.

An outgoing gear 26, which corresponds to the gear 9 in FIG. 1, is journalled in relation to the second shaft 22 by means of bearings 26' but also in relation to a part (not shown) external to the gear unit by means of a radial bearing 27. The outgoing gear 26 is connected to each of the second planet wheels 24 by means of a screw 28 and a sleeve 29 constituting a stub axle for each second planet wheel 24 having a through center hole. A bearing 30 is provided between the sleeve 29 and each second planet wheel 24.

The described planetary gear unit will provide a rotational speed reduction in two stages from the ingoing shaft 16 to the outgoing gear 26, namely a first stage by the first planet wheel 19 and the crank arm 21 to the second shaft or sun wheel 22, 23 and a second stage by the second planet wheels 24 rotatably connected to the outgoing gear 26.

The speed reduction will of course depend on the dimensioning of the different gears and parts. It may be advantageous to have a rotational speed reduction in each stage of say 1:4–1:6. In a practical embodiment a rotational speed reduction of 1:4,5 is accomplished in each stage, giving an over-all reduction for the planetary gear unit of 1:20,25 with a high efficiency and a high ability for moment transmission.

The planetary gear unit is described in its use with a disc brake having two thrust rods but is equally applicable to a brake with any other number of thrust rods.

What is claimed is:

1. A planetary gear unit in an electrically operated brake for reducing the rotational speed from a drive shaft of an electric motor to an outgoing rotating means, which transmits a brake applying rotational movement to the brake, comprising a first planet wheel between a sun wheel gearing on an ingoing first shaft and a first internal gearing in a housing of the unit, a crank arm, on which the first planet wheel is rotationally arranged and which is rigidly connected to a second shaft coaxial with the first shaft, at least one second planet wheel between a second sun wheel gearing on the second shaft and a second internal gearing in the housing of the unit, and an outgoing gear, which is coaxial with the first and second shafts and to which the at least one second planet wheel is rotatably connected, characterized in that the first and second shafts are journalled in relation to each other by means of a radial bearing and in that the outgoing gear is journalled on the second shaft by means of radial bearings.

2. A unit according to claim 1, characterized in that the first planet wheel is rotationally arranged on a pin on the crank arm over a bearing.

3. A unit according to claim 1, characterized in that three second planet wheels are equidistantly distributed between the second sun wheel gearing and the second internal gearing.

4. A unit according to claim 1, characterized in that the outgoing gear is provided with at least one pin for the second planet wheel.

5. A unit according to claim 4, characterized in that the pin comprises a screw and a sleeve and that the second planet wheel is journalled on the sleeve by means of a bearing.

6. A unit according to claim 1, characterized in that the dimensioning of the different members in the gear unit is such that the rotational speed reduction in each of the two stages of the unit is in the order of 1:4–1:6, the first stage comprising the first shaft, the first planet wheel, and the crank arm, and the second stage comprising the second shaft, the second planet wheels, and the outgoing gear.

* * * * *